United States Patent [19]

Eich

[11] 4,327,582
[45] May 4, 1982

[54] LIQUID WHEEL BALANCER

[76] Inventor: Arnold M. Eich, R.R. 2, Flandreau, S. Dak. 57028

[21] Appl. No.: 171,444

[22] Filed: Jul. 23, 1980

[51] Int. Cl.³ .............................................. G01M 1/12
[52] U.S. Cl. .................................................... 73/483
[58] Field of Search ..................... 73/66, 482, 483, 480

[56] References Cited

U.S. PATENT DOCUMENTS

| 953,811 | 4/1910 | Bassett | 73/483 |
| 3,595,068 | 7/1971 | Skidmore | 73/66 |

FOREIGN PATENT DOCUMENTS

| 245305 | 1/1926 | United Kingdom | 73/483 |
| 694648 | 7/1953 | United Kingdom | 73/66 |
| 173995 | 12/1965 | U.S.S.R. | 73/483 |

OTHER PUBLICATIONS

"Manufacture of Bowling Balls At Stowe-Woodward" From Rubber Age, Aug. 1954, pp. 688-689.

Primary Examiner—James J. Gill

[57] ABSTRACT

A liquid wheel balancer including a spherical bubble level mounted on a disc held on the rim of a wheel by telescoping, adjustable arms radiating from the disc. This assembly, and the tire and wheel are floated horizontally in a tub of water or other liquid whereupon by the proper placement of balancing weights and observation of the bubble level the wheel may be balanced.

5 Claims, 3 Drawing Figures

LIQUID WHEEL BALANCER

BACKGROUND AND SUMMARY OF THE INVENTION

It is well known that the tires of motor vehicles will wear longer when they are properly balanced with the wheel on which they are mounted. When balanced, they spin in a true circle, thus avoiding uneven wear. This balancing is generally achieved by crimping various weights to the rim of the wheel at places determined by the use of a balancing apparatus.

By my invention I have eliminated distorting factors, such as friction, common to other balancing machines by using a tub of liquid as the balancing medium. A spherical bubble level, mounted on a disc with radiating arms is placed in the wheel so that the proper placement of the weights may be determined. The infinite adjustability of the radiating arms makes my invention adaptable to any size wheel.

FIGURES

DESCRIPTION

Figure 1:
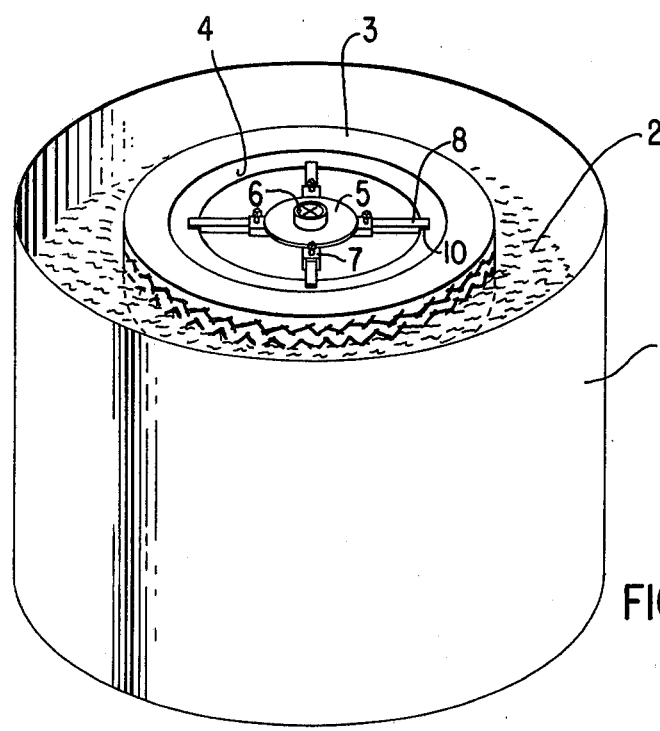
FIG. 1 is a pictorial view of the device in use.
Figure 2:
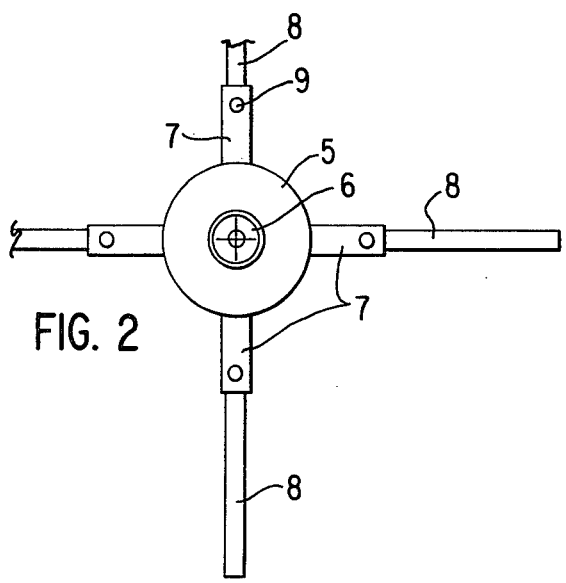
FIG. 2 is a top view of the level determining means of the device.
Figure 3:
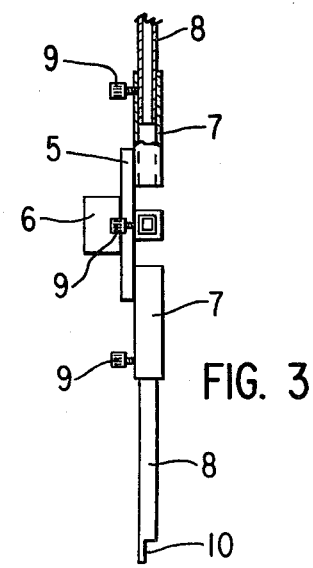
FIG. 3 is a side view with certain cutaways to reveal the structure of the device's level determining means.

Briefly, my invention is a balancing means by which tires and wheels may be balanced so as to provide maximum tire wear. The means consists of a liquid-filled tub of sufficient depth to allow the insertion of the tire and wheel in a vertical plane and of sufficient diameter to allow the wheel and tire to float in a horizontal plane. The tire is inserted into the tub in a vertical position to avoid the trapping of air under the wheel as it is rotated to a horizontal plane. Were such air trapped, its buoyancy would distort the reading of the bubble level. A spherical bubble level is mounted on a disc; the disc being located at the intersection of radiating arms. The level is held on the wheel by means of slidably adjustable arms. When the disc and level are adjusted so as to be in the same plane as the wheel, and therefore as the tire, balancing weights may be located in the appropriate places as determined by reading the level.

More specifically, and referring to the drawings, I provide a tub 1 of diameter larger than the tire to be balanced and in which is sufficient water or other liquid 2 to float the tire 3 and wheel 4 freely in a horizontal plane. The tub 1 and the liquid 2 must also be deep enough to allow for the vertical immersion of the tire completely into the water. This method of insertion ensures that no free air will be trapped by the wheel 4 and tire 3 as they are rotated to the horizontal plane completely beneath the surface of the liquid 2. Were free air to be trapped, it would by buoying up part of the wheel alter the plane in which the tire 3 floats thus introducing distortion into the balancing operation. After full immersion, the tire 3 and wheel 4 are rotated to the horizontal plane and allowed to float.

Prior to immersion a level determining means consisting of a disc 5 to the center of which is mounted a spherical bubble level 6 is mounted onto the wheel 4. Radiating from the center of the disc 5 are sleeves 7 into which arms 8 are fitted. In the drawing, this device is pictured with four sleeves and arms, but the concept is equally workable with three or more of each. The sleeves and arms should be positioned so that, regardless of the number chosen, they divide the disc 5 into equal segments. The arms 8 are slidably adjustable in the sleeves 7 and have their position fixed by means of a thumbscrew 9 or other position holding device. Additional adjustability may be achieved by providing several interchangeable sets of arms 8 of various lengths. Each of the arms is provided at its terminus with a tang 10 by which means the device is rested on the rim of wheel 4.

In its use, either before or after the tire and wheel have been floated, as described above, in tub 1, the level determining means is positioned such that the spherical level 6 is located over the center of the wheel 4. This positioning is accomplished by adjusting arms 8 so that the tangs 10 rest on the rim of wheel 4. As a result of the positioning, the level determining means should rest in the same plane as that in which the tire spins. Balancing weights are then used to achieve a balanced wheel as determined by reading the level.

I claim as my invention:

1. A wheel balancing device comprising a tub of liquid of sufficient size to immerse vertically a tire and wheel and to rotate the same so that it floats horizontally, a tire and wheel assembly in said tub and level determining means including a spherical bubble level removably mounted on said tire and wheel assembly.

2. The device of claim 1 in which level determining means includes not less than three arms, said arms engaged with said wheel whereby said bubble level is held in fixed relationship to said wheel.

3. The device in claim 2 in which the level determining means is held in a fixed relationship to said wheel by means including a tang at the terminus of said arms.

4. The device in claim 2 in which said arms are slidably adjustable in sleeves, said arms having their position fixed by engagement of adjustment means.

5. The device in claim 4 in which the device is equipped with several interchangeable sets of arms of varying lengths for maximum adjustability.

* * * * *